United States Patent
Dickson et al.

(10) Patent No.: US 10,093,345 B1
(45) Date of Patent: Oct. 9, 2018

(54) SYSTEM AND METHOD FOR TESTING A HANDS-OFF CLUTCH FOR A STEERING HARDWARE-IN-LOOP (HIL) SYSTEM

(71) Applicant: GM GLOBAL TECHNOLOGY OPERATIONS LLC, Detroit, MI (US)

(72) Inventors: William F. Dickson, Royal Oak, MI (US); Theodore P. Konieczny, Williamston, MI (US); Aaron Ronald, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/464,982

(22) Filed: Mar. 21, 2017

(51) Int. Cl.
*B62D 5/04* (2006.01)
*G09B 9/00* (2006.01)
*B62D 7/20* (2006.01)

(52) U.S. Cl.
CPC ............ *B62D 5/0457* (2013.01); *B62D 5/04* (2013.01); *B62D 5/043* (2013.01); *B62D 7/20* (2013.01)

(58) Field of Classification Search
CPC .... B62D 5/0457; B62D 1/184; B62D 5/0484; B62D 5/0409; B62D 5/04; B62D 5/0424; B62D 5/0439; B62D 5/046; B62D 6/10; G09B 9/05; G09B 9/00; A63H 29/20; B60K 1/00; B60K 7/0007
See application file for complete search history.

(56) References Cited

U.S. PATENT DOCUMENTS

| | | | | |
|---|---|---|---|---|
| 3,251,142 A | * | 5/1966 | Jazbutis | G09B 9/05 346/136 |
| 4,141,256 A | * | 2/1979 | Wilson | A63H 29/20 446/463 |
| 5,027,276 A | * | 6/1991 | Morishita | B62D 5/0484 180/404 |
| 5,027,915 A | * | 7/1991 | Suzuki | B62D 5/0439 180/443 |
| 5,670,854 A | * | 9/1997 | Matsuura | B62D 5/046 318/432 |
| 5,836,419 A | * | 11/1998 | Shimizu | B62D 5/04 180/443 |
| 8,567,262 B2 | * | 10/2013 | Tsuda | B62D 5/0409 73/862.335 |
| 2004/0237517 A1 | * | 12/2004 | Cho | B60K 1/00 60/370 |
| 2007/0119649 A1 | * | 5/2007 | Manken | B60K 7/0007 180/446 |

(Continued)

FOREIGN PATENT DOCUMENTS

CN 203854717 U * 10/2014 ............... B62D 5/04
CN 206421648 U * 8/2017 ............... G09B 9/00

*Primary Examiner* — Yuri Kan
(74) *Attorney, Agent, or Firm* — Cantor Colburn LLP

(57) ABSTRACT

A calibration system for an electric power steering system includes a hardware-in-loop (HIL) test fixture, and an electric power steering system mounted to the HIL test fixture. The electric power steering system includes a power steering rack, and an intermediate shaft (I-shaft) mechanically connected to the power steering rack. An electric motor is operatively connected to the HIL test fixture. A clutch assembly is operatively connected between the electric motor and the I-shaft. The clutch assembly is operable to selectively connect the electric motor with the I-shaft.

14 Claims, 4 Drawing Sheets

(56) References Cited

U.S. PATENT DOCUMENTS

| | | | |
|---|---|---|---|
| 2013/0030652 A1* | 1/2013 | Jung | B62D 5/0424 |
| | | | 701/41 |
| 2016/0009311 A1* | 1/2016 | Khale | B62D 1/184 |
| | | | 74/530 |
| 2017/0174259 A1* | 6/2017 | Meyhofer | B62D 6/10 |

* cited by examiner

SYSTEM AND METHOD FOR TESTING A HANDS-OFF CLUTCH FOR A STEERING HARDWARE-IN-LOOP (HIL) SYSTEM

INTRODUCTION

The subject invention relates to the art of electric power steering systems and, more particularly, to a system and method for testing hands-off clutch for a steering hardware-in-loop steering system.

A vehicle may be equipped with an electric power steering system. The electric power steering system uses an electric motor to assist a driver of the vehicle in turning the front or rear wheels of the vehicle. Sensors detect a position of a steering column and/or steering wheel, input torque, as well as current operating conditions of the vehicle. A steering controller applies an assist via the electric motor, to modify the amount of applied torque input by the driver to turn the steering wheel.

The steering controller controls the electric motor to apply the desired assist. Typically, the amount of assist input will vary with vehicle operating conditions of the vehicle. The vehicle controller may reference a calibration that relates various operating conditions of the vehicle to a desired assist. The calibration is stored in an electronic memory of the steering controller. The calibration is created to provide a desirable amount of assist or feel for the various operating conditions of the vehicle. Typically, calibration values stored in the controller are derived through various testing techniques conducted during vehicle development.

Electric power steering systems are difficult to model electronically. Accordingly, in the past, tuning the calibration for electric power steering systems has been done by installing the electric power steering system on a prototype vehicle, test driving the prototype vehicle with a defined calibration, and then adjusting the calibration based on the subjective feel observed by the test driver of the prototype vehicle. Testing through a prototype vehicle is time consuming, costly and could pose a safety concern. Further, testing through the use of a prototype vehicle could result in inconsistent calibrations. Accordingly, it is desirable to provide a system and method for bench testing and calibrating an electric power steering system.

SUMMARY

In accordance with an exemplary aspect, a calibration system for an electric power steering system includes a hardware-in-loop (HIL) test fixture, and an electric power steering system mounted to the HIL test fixture. The electric power steering system includes a power steering rack, and an intermediate shaft (I-shaft) mechanically connected to the power steering rack. An electric motor is operatively connected to the HIL test fixture. A clutch assembly is operatively connected between the electric motor and the I-shaft. The clutch assembly is operable to selectively connect the electric motor with the I-shaft.

In addition to one or more of the features described above or below, or as an alternative, further embodiments could include wherein the clutch assembly includes a first clutch portion fixedly connected to the electric motor and a second clutch portion fixedly connected to the I-shaft.

In addition to one or more of the features described above or below, or as an alternative, further embodiments could include wherein the first clutch portion comprises an energizeable member selectively lockable to the second clutch portion.

In addition to one or more of the features described above or below, or as an alternative, further embodiments could include a clutch support operatively connected to the electric motor, the clutch support including a clutch mounting zone receptive of the energizeable member.

In addition to one or more of the features described above or below, or as an alternative, further embodiments could include a clutch support member fixedly mounted to the I-shaft receptive of the second clutch portion.

In addition to one or more of the features described above or below, or as an alternative, further embodiments could include wherein the I-shaft extends through the electric motor.

In addition to one or more of the features described above or below, or as an alternative, further embodiments could include a clutch support operatively connected to the electric motor, the clutch support including a clutch mounting zone.

In addition to one or more of the features described above or below, or as an alternative, further embodiments could include wherein the power steering rack includes a first end, a second end, and an intermediate portion extending therebetween and being coupled to the HIL test fixture, the I-shaft being operatively coupled to the intermediate portion.

In addition to one or more of the features described above or below, or as an alternative, further embodiments could include an electric power steering (EPS) motor including a first end portion operatively coupled to the first end of the power steering rack and a second end portion.

In addition to one or more of the features described above or below, or as an alternative, further embodiments could include a first tie rod operatively connected to the second end of the power steering rack and a second tie rod operatively coupled to the second end portion of the EPS motor.

In addition to one or more of the features described above or below, or as an alternative, further embodiments could include a first actuator operatively coupled to the first tie rod and a second actuator operatively coupled to the second tie rod, the first and second actuators being operable to act upon one or more of the first and second tie rods to simulate vehicle operation.

In accordance with another aspect of an exemplary embodiment, a method of tuning a calibration for an electric power steering system includes energizing a clutch assembly to operatively connect a steering column to an electric motor, activating the electric motor to rotate the steering column to simulate a steering maneuver, denergizing the clutch assembly to simulate a hands-free steering maneuver, and sensing a steering response in the electric power steering system during one of the steering maneuver and the hands-free steering maneuver.

In addition to one or more of the features described above or below, or as an alternative, further embodiments could include collecting data during the one of the steering maneuver and the hands-free steering maneuver, and updating a calibration of the electric power steering system based on the data.

In addition to one or more of the features described above or below, or as an alternative, further embodiments could include inputting one or more forces to a tie rod of the electric power steering system to simulate driving conditions during the steering maneuver.

In addition to one or more of the features described above or below, or as an alternative, further embodiments could include inputting one or more forces to a tie rod of the electric power steering system to simulate driving conditions during the hands-free steering maneuver.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

Figure 1:
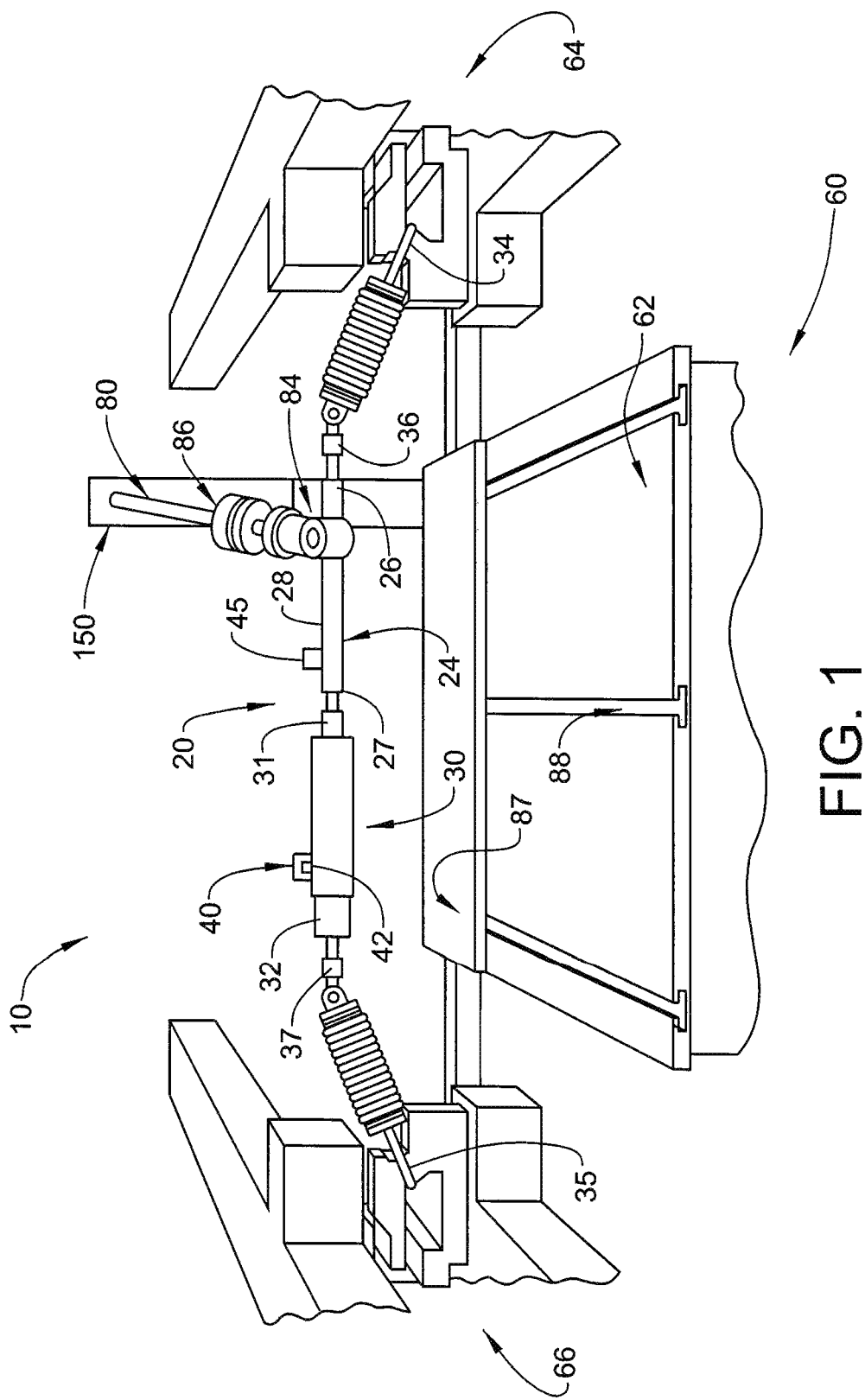
FIG. 1 depicts a plan view of a system for testing a hands-off clutch for a steering hardware-in-loop steering system, in accordance with an exemplary embodiment.

The following description is merely exemplary in nature and is not intended to limit the present disclosure, its application or uses. It should be understood that throughout the drawings, corresponding reference numerals indicate like or corresponding parts and features. As used herein, the term "module" or "unit" refers to an application specific integrated circuit (ASIC), a field programmable gate array (FPGA), an electronic circuit, an electronic computer processor (shared, dedicated, or group) and memory that executes one or more software or firmware programs, a hardware microcontroller, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

A hardware-in-loop (HIL) test system, in accordance with an exemplary embodiment, is indicated generally at 10 in FIG. 1. HIL test system 10 supports a power steering system 20 for one or more testing procedures. Power steering system 20 includes a power steering rack 24 having a first end 26 a second end 27, and an intermediate portion 28. An electric power steering (EPS) motor 30 is coupled to power steering rack 24. More specifically, EPS motor 30 includes a first end portion 31 coupled to second end 27 of power steering rack 24 and a second end portion 32. It is to be understood that motor 32 could also be coupled to power steering rack through a shaft (not shown) or through a belt (also not shown). A first tie rod 34 is operatively connected to first end 26 of power steering rack 24 and a second tie rod 35 is operatively connected to second end portion 32 of EPS motor 30. Each of the first tie rod 34 and the second tie rod 35 may include an associated first force transducer 36 and a second force transducer 37.

Power steering system 20 also includes a steering controller 40 that may selectively control EPS motor 30 during a driving maneuver. Steering controller 40 may include a calibration 42 that may take the form of a look-up table or a set of calibration equations that provide data for selectively controlling EPS motor 30. Steering controller 40 may be operatively connected to a torque sensor 45 that provides steering feedback during the driving maneuver. Power steering system 20 is mounted to an HIL test fixture 60 having a test bed 62 including a first actuator 64 coupled to first tie rod 34 and a second actuator 66 coupled to second tie rod 35. As will be detailed more fully below, HIL test system 10 provides simulated steering maneuvers through first and second actuators 64 and 66 to power steering system 20 for testing, evaluation, and design of power steering components, as well as for calibrating or tuning calibration 42.

In accordance with an aspect of an exemplary embodiment, power steering system 20 includes a steering column, shown in the form of an intermediate shaft (I-shaft) 80 operatively connected to power steering rack 24 through an electric motor 84. It is to be understood that electric motor 84 could also be coupled along I-Shaft 80 and spaced from power steering rack 24. Electric motor 84 is selectively activated to simulate steering inputs, such as would be applied by a driver or by an autonomous controller (not shown) to power steering rack 24. A clutch assembly 86 is also connected to I-shaft 80 and is selectively activated to simulate hands-free steering maneuvers as will be detailed below. Clutch assembly 86 could be mounted to a platform 87 that may be selectively positioned upon test bed 62 through slots, one of which is indicated at 88 so as to provide n-degrees of freedom for HIL test system 10.

Figure 2:
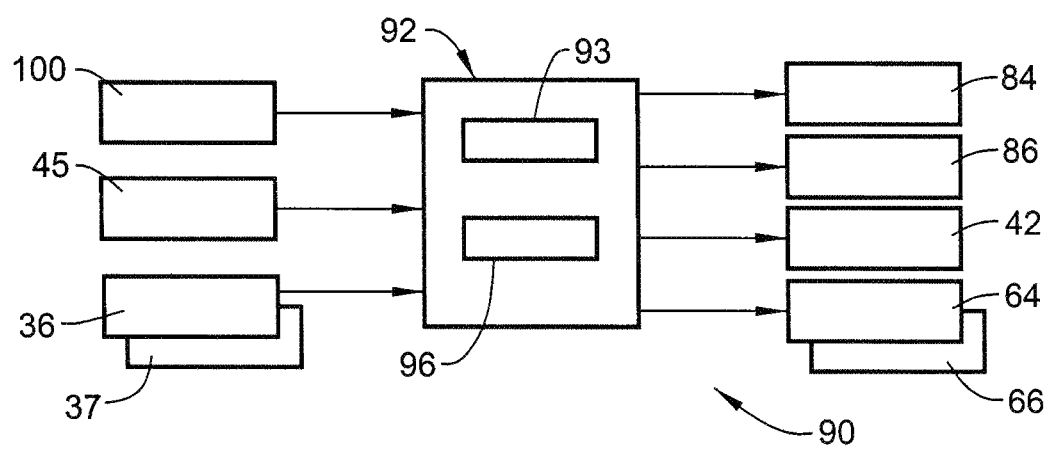
FIG. 2 depicts a block diagram illustrating a calibration system for the system for testing the hands-off clutch for a steering hardware-in-loop steering system of FIG. 1, in accordance with an aspect of an exemplary embodiment.

As shown in FIG. 2 and with continuing reference to FIG. 1, HIL test system 10 includes a calibration system 90 that simulates one or more steering maneuvers. Calibration system 90 includes controller 92 having a steering simulation module 93 and a memory 96. Steering simulation module 93 may also include a user input 100 that may provide instructions to calibration system 90 for selectively controlling first and second actuators 64 and 66, electric motor 84 and clutch assembly 86 to simulate one or more steering maneuvers. It is to be understood that the number of actuators may vary. Steering simulation module 93 may also receive inputs from first and second force transducers 36 and 37 associated with first and second tie rods 34 and 35 respectively. Steering simulation module 93 may then provide updates to calibration 42 to improve driving and steering responses.

Figure 3:
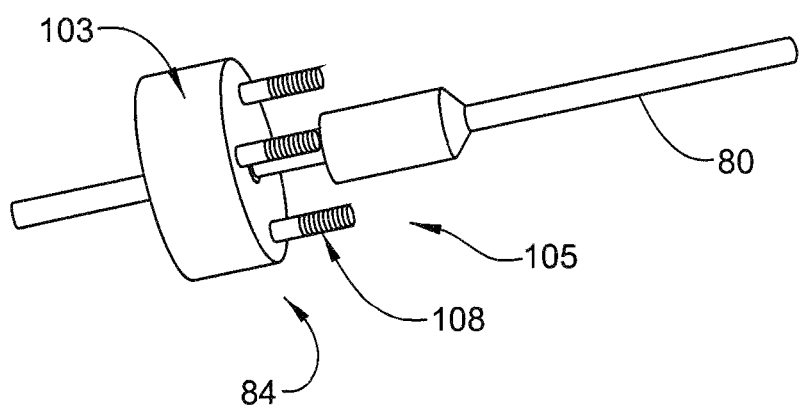
FIG. 3 depicts an electric motor of the hands off clutch of FIG. 1, in accordance with an aspect of an exemplary embodiment.
Figure 4:
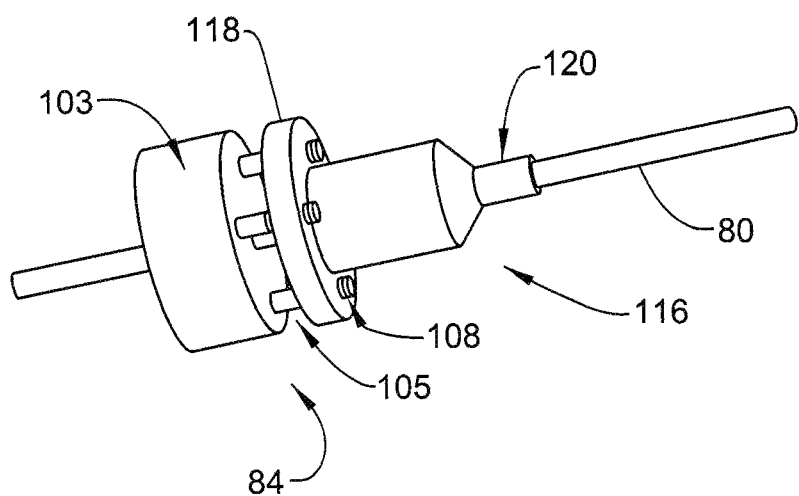
FIG. 4 depicts a clutch support coupled to the electric motor of FIG. 3, in accordance with an aspect of an exemplary embodiment.
Figure 5:
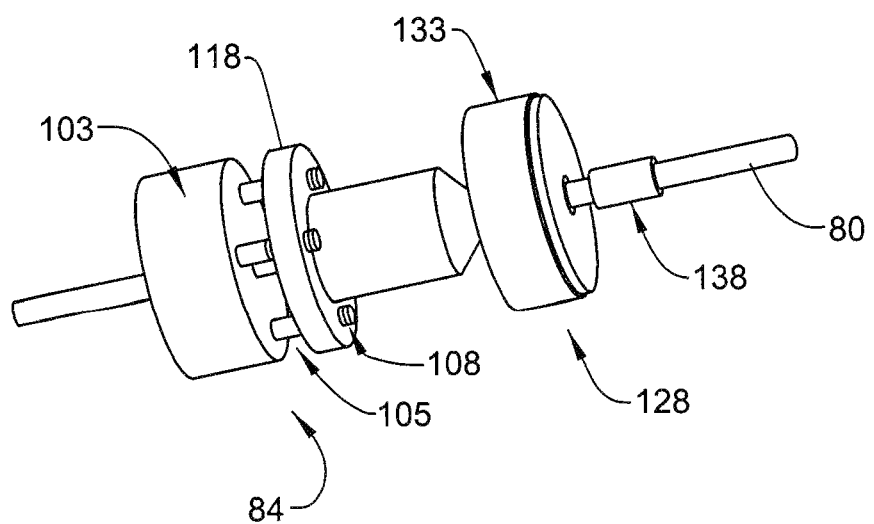
FIG. 5 depicts a first clutch portion mounted to the clutch support of FIG. 4, in accordance with an aspect of an exemplary embodiment.
Figure 6:
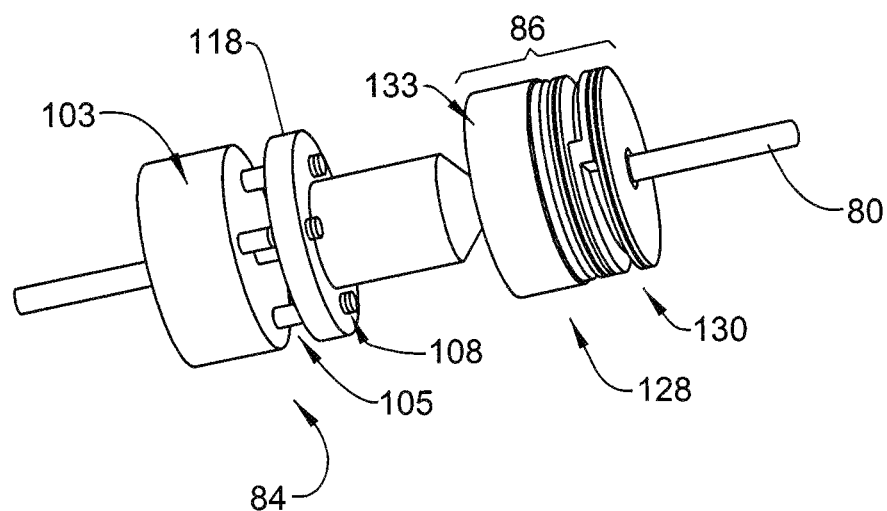
FIG. 6 depicts a second clutch portion mounted to the clutch support of FIG. 5, in accordance with an aspect of an exemplary embodiment.
Figure 7:
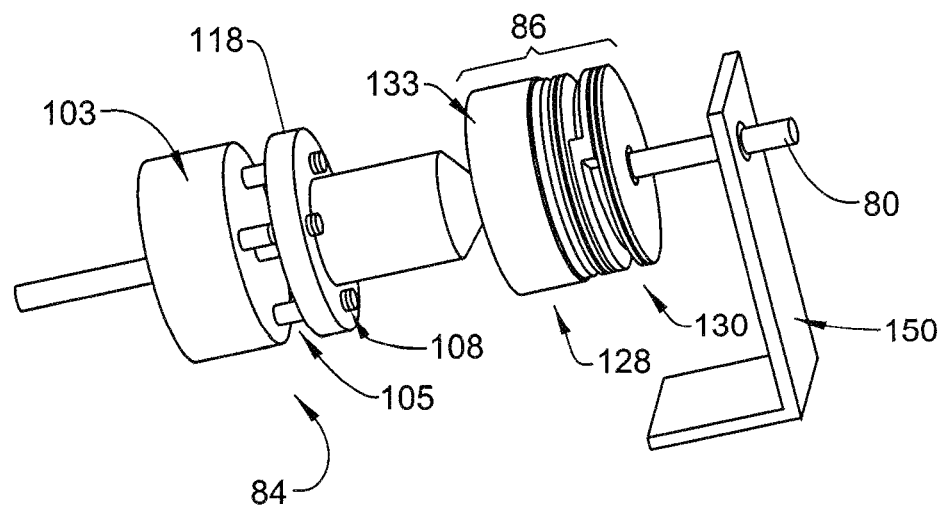
FIG. 7 depicts a cantilevered end of the clutch support of FIG. 6 supported by a support fixture, in accordance with an aspect of an exemplary embodiment.

Reference will now follow to FIGS. 3-7 in describing details of electric motor 84 and clutch assembly 86. As shown in FIG. 3, electric motor 84 includes a body 103 and a plurality of mechanical fasteners 105. Mechanical fasteners 105 may take the form of threaded studs 108 extending from body 103. A clutch support 116 may be connected to electric motor 84 as shown in FIG. 4. Clutch support 116 includes a flange 118 including a plurality of openings (not separately labeled) that receive corresponding ones of mechanical fasteners 105. Clutch support 116 also includes a clutch mounting zone 120 that supports a portion of clutch assembly 86. More specifically, clutch assembly 86 includes a first clutch portion 128 and a second clutch portion 130 (FIG. 6). First clutch portion 128 may take the form of an energizeable member 133 that is coupled to clutch mounting zone 120 as shown in FIG. 5. In this manner, energizeable member 133 is fixed for rotation with electric motor 84.

In further accordance with an exemplary aspect, a clutch support member 138 may be provided on I-shaft 80. Second clutch portion 130 is mounted to I-shaft 80 on clutch support member 138 as shown in FIG. 6. Second clutch portion 130 may be fixed for rotation with I-shaft 80. After mounting clutch assembly 86, a support fixture 150 may be coupled to a cantilevered end portion (not separately labeled) of I-shaft 80. With this arrangement, steering simulation module 93 may activate energizeable member 133 locking electric motor 84 to I-shaft 80. Steering simulation module 93 may then activate electric motor 84 to simulate a steering maneuver.

In addition, steering simulation module 93 may selectively activate one or more of first and second actuators 64 and 66 to simulate a response to the steering maneuver. If desired, steering simulation module 93 may deactivate energizeable member 133 allowing I-shaft 80 to freely rotate to simulate a hands-free steering maneuver. Calibration system 90 may then determine how power steering system 20 responds to the steering maneuver and/or the hands-free steering maneuver to make updates to calibration 42. The updates may then be employed in production vehicles to enhance a drivers experience with the vehicle. The updates may also be utilized by autonomous controllers to enhance driving characteristics. Additionally, the updates enhance system response to initial calibrations, reduce over-all in-vehicle development time, and make calibrations more uniform across an entire vehicle fleet by employing defined metrics. The use of HIL test system 10 allows vehicle designers to simulate driving conditions in real time without the need to construct specially outfitted test vehicles that may be monitored on a test track.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the invention not be limited to the particular embodiments disclosed, but will include all embodiments falling within the scope of the application.

What is claimed is:

1. A calibration system for an electric power steering system comprising:
   a hardware-in-loop (HIL) test fixture;
   an electric power steering system mounted to the HIL test fixture, the electric power steering system including a power steering rack, and an intermediate shaft (I-shaft) mechanically connected to the power steering rack;
   an electric motor operatively connected to the HIL test fixture;
   a clutch support operatively connected to the electric motor, the clutch support including a clutch mounting zone; and
   a clutch assembly operatively connected to the clutch mounting zone between the electric motor and the I-shaft, the clutch assembly being operable to selectively connect the electric motor with the I-shaft.

2. The calibration system according to claim 1, wherein the clutch assembly includes a first clutch portion fixedly connected to the electric motor and a second clutch portion fixedly connected to the I-shaft.

3. The calibration system according to claim 2, wherein the first clutch portion comprises an energizeable member selectively lockable to the second clutch portion.

4. The calibration system according to claim 3, further comprising: a clutch support operatively connected to the electric motor, the clutch support including a clutch mounting zone receptive of the energizeable member.

5. The calibration system according to claim 4, further comprising: a clutch support member fixedly mounted to the I-shaft receptive of the second clutch portion.

6. The calibration system according to claim 1, wherein the I-shaft extends through the electric motor.

7. The calibration system according to claim 1, wherein the power steering rack includes a first end, a second end, and an intermediate portion extending therebetween and being coupled to the HIL test fixture, the I-shaft being operatively coupled to the intermediate portion.

8. The calibration system according to claim 7, further comprising: an electric power steering (EPS) motor including a first end portion operatively coupled to the first end of the power steering rack and a second end portion.

9. The calibration system according to claim 8, further comprising: a first tie rod operatively connected to the second end of the power steering rack and a second tie rod operatively coupled to the second end portion of the EPS motor.

10. The calibration system according to claim 9, further comprising: a first actuator operatively coupled to the first tie rod and a second actuator operatively coupled to the second tie rod, the first and second actuators being operable to act upon one or more of the first and second tie rods to simulate vehicle operation.

11. A method of tuning a calibration for an electric power steering system comprising:
    energizing a clutch assembly to operatively connect a steering column to an electric motor;
    activating the electric motor to rotate the steering column to simulate a steering maneuver;
    de-energizing the clutch assembly to simulate a hands-free steering maneuver; and
    sensing a steering response in the electric power steering system during each of the steering maneuver and the hands-free steering maneuver.

12. The method of claim 11, further comprising:
    collecting data during the one of the steering maneuver and the hands-free steering maneuver; and
    updating a calibration of the electric power steering system based on the data.

13. The method of claim 11, further comprising: inputting one or more forces to a tie rod of the electric power steering system to simulate driving conditions during the steering maneuver.

14. The method of claim 11, further comprising: inputting one or more forces to a tie rod of the electric power steering system to simulate driving conditions during the hands-free steering maneuver.

* * * * *